United States Patent Office 3,537,840
Patented Nov. 3, 1970

3,537,840
SYNERGISTIC HERBICIDAL COMPOSITION OF SODIUM N-NAPHTHYL PHTHALAMIC ACID AND 4 - (METHYLSULFONYL)-2,6-DINITRO-N,N-DIPROPYLANILINE
Joseph E. Barron, Shelton, Conn., Donald F. Fox, Morgantown, Ind., and Adam H. Soboleski and Ronald B. Ames, Naugatuck, Conn., assignors to Uniroyal, Inc., New York, N.Y., a corporation of New Jersey
No Drawing. Filed Nov. 7, 1967, Ser. No. 681,100
Int. Cl. A01n 9/02, 9/14, 9/20
U.S. Cl. 71—103    2 Claims

ABSTRACT OF THE DISCLOSURE

This invention relates to a new and improved synergistic herbicidal composition containing an admixture of N-aryl phthalamic acids and 4-(methylsulfonyl)-2,6-dinitro-N,N-substituted anilines. More specifically, the invention teaches the formulation containing the aforesaid chemicals in a complete single phase solution.

---

The composition of the invention gives greater herbicidal activity than the full strength treatment of either alone. This permits application of less total active ingredients per unit area and, therefore, greater crop safety.

The N-aryl phthalamic acids may be represented by the following formula:

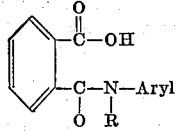

where R is hydrogen, or an alkyl radical, e.g., methyl, ethyl, n-propyl, isopropyl, n-butyl, isobutyl, sec-butyl, amyl, hexyl, octyl. The aryl group may be a phenyl or naphthyl group, which may be substituted, as haloaryl, nitroaryl, alkylaryl, or hydroxyaryl, e.g., o-chlorophenyl, m-chlorophenyl, p-chlorophenyl, 2,4-dichlorophenyl, 2,5-dichlorophenyl, 2,4,5-trichlorophenyl, 2-methyl-4-chlorophenyl, 2-bromophenyl, 4-bromophenyl, 2,4,5-tribromophenyl, o-nitrophenyl, m-nitrophenyl, p-nitrophenyl, 2-methyl-4-nitrophenyl, 2-chloro-4-nitrophenyl, o-hydroxyphenyl, m-hydroxyphenyl, p-hydroxyphenyl, 2-chloro-4-hydroxyphenyl, o-tolyl, m-tolyl, p-tolyl, alphanaphthyl, beta-naphthyl. The N-aryl-phthalamic acids may be used in the form of the free acids; or their esters, e.g., methyl, ethyl, propyl, or butyl esters; or their salts such as the alkali (i.e., alkali-metal, ammonium and amine) salts, e.g., sodium, potassium, ammonium, methyl ammonium, dimethyl ammonium, trimethyl ammonium, ethyl ammonium, ethanol ammonium, diethanol ammonium, or triethanol ammonium salts of the N-aryl phthalamic acids, since the esters and salts give equivalent results. The water soluble forms are preferred. The preparation of the aforesaid compounds and their use as plant growth regulants and phytocides are illustrated in U.S. Pat. 2,556,665.

The 4-(methylsulfonyl)-2,6-dinitro - N,N - substituted anilines have the generic formula:

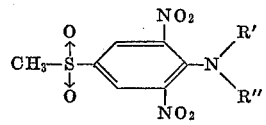

wherein R' and R'' each is alkyl or alkenyl of at least two carbon atoms, but together contain a total of no more than eight carbon atoms. 4-(methylsulfonyl)-2,6-dinitro-N,N-dipropylaniline and 4-(methylsulfonyl)-2,6-dinitro-N,N-dialkylaniline are preferred.

The preparation of these compounds and their use as herbicides are illustrated in U.S. Pats. 3,227,734 and 3,321,292.

While a broad range of mixtures exhibit the desired synergistic effect most preferably from ⅓ to 4 parts by weight of the N-aryl phthalamic acid compound are used for each part of the 4-(methylsulfonyl)-2,6-dinitro-N,N-substituted aniline compound. Concentrations containing from 2 to 4 pounds of active components per gallon are preferably employed.

In a particularly preferred embodiment of the invention, the synergistic combination of herbicides are formulated in a single phase liquid concentrate. Such a concentrate is particularly desirable, but difficult to achieve in the case of admixtures of materials having diversely different solubility characteristics.

In order to form the single liquid phase a solvent system containing dimethylsulfoxide and a water immiscible solvent is used. The dimethylsulfoxide component serves to dissolve the water soluble N-1 naphthyl phthalamate salt and the water immiscible component the 4-(methyl sulfonyl)-2,6-dinitro-N,N-dialkylaniline. A homogeneous solution results from the combination of the two solutions with or without the addition of an emulsifier. In accordance with common practice an emulsifier is added to the ultimate spray mixture for field application of the herbicide. The most preferred emulsifiers are the anionic-nonionic blends. These blends are made up of oil soluble sulfonates with polyoxyethylene ethers or polyoxyethylene derivatives and alkyl aryl sulfonates.

The relative amounts of the herbicides, solvents and emulsifier are of particular importance in obtaining the homogeneous solution. Excessive or insufficient quantities of these components will result in the formation of undesirable precipitates, dispersions or two-phase solutions. Based on the total concentrate, the following concentration of materials may be used.

TABLE 1

| Component: | Percent by weight |
|---|---|
| Water-soluble N-naphthyl phthalamate | 5–35 |
| 4(methyl sulfonyl)-2,6-dinitro - N,N - dialkyl aniline | 5–16 |
| Dimethylsulfoxide | 4–25 |
| Water immiscible solvent | 15–70 |
| Emulsifier | 0–20 |

The water immiscible solvent must be capable of dissolving the 4-(methyl sulfonyl) - 2,6 - dinitro - N,N-substituted aniline. Preferred materials are nitrobenzene, monochlorobenzene, nitropropane-1 and nitropropane-2.

Examples of the preparation of this invention are as follows.

Concentrate A

| Material: | Parts |
|---|---|
| Sodium N-1 naphthyl phthalamate (87.2% active) | 33.6 |
| 4(methylsulfonyl)-2,6-dinitro - N,N - dipropylaniline | 7.4 |
| Dimethyl sulfoxide | 21.2 |
| Emcol H–500B [1] | 9.0 |
| Nitrobenzene | 28.8 |
| Total | 100.0 |

Specific gravity—1.223.

[1] See footnote at end of table.

Concentrate B

| Material: | Parts |
|---|---|
| Sodium N-1 naphthyl phthalamate (87.2% active) | 23.7 |
| 4(methylsulfonyl)-2,6-dinitro - N,N-dipropyl-aniline | 10.35 |
| Dimethyl sulfoxide | 17.30 |
| Emcol H-500B [1] | 10.35 |
| Mono-chlorobenzene | 38.30 |
| Total | 100.00 |

Specific gravity—1.159.

Concentrate C

| Material: | Parts |
|---|---|
| Sodium N-1 naphthyl phthalamate (87.2% active) | 22.9 |
| 4(methylsulfonyl)-2,6-dinitro-N,N - dipropyl-aniline | 5.1 |
| Dimethyl sulfoxide | 16.7 |
| Nitrobenzene | 45.3 |
| Emcol H-500B [1] | 10.0 |
| Total | 100.0 |

Specific gravity—1.199.

[1] A blend of oil soluble calcium sulfonates with polyoxyethylene ethers mfg. by Witco Chemical Co., Inc.

The following examples illustrate the herbicidal synergism of a 2½ lbs./gallon emulsifiable concentrate of Concentrate C.

EXAMPLE I

The herbicidal compositions were applied by using a pre-emergent application to soil. One hundred and fifty mm. pots were filled with sandy loam soil. A mixture of four broadleaf weed species, namely pigweed—*Amaranthus retroflexus*, purslane—*Portulaca oleracea*, lamb's-quarters—*Chenopodium album* and oxeye daisy—*Chrysanthemum leucanthemum*, and three grass species, namely crabgrass—*Digitaria sanquinalis*, barnyardgrass—*Echinochloa crusgalli*, and giant foxtail—*Setaria faberii* were placed on the soil surface and covered lightly with soil. The pots were sprayed with concentrate sprayer delivering 30 gallons/acre. The pots were placed in greenhouse and subirrigated to maintain field capacity. Data were recorded 25 days later and are presented in Table I.

TABLE I

| Treatment | Application rate, lbs. herbicide/acre | Percent weed control |
|---|---|---|
| Sodium N-naphthyl phthalamate | 4.0 | 76.7 |
| 4(methyl sulfonyl)-2,6-dinitro-N,N-dipropyl aniline | 1.0 | 5.0 |
| Concentrate C | 5.0 | 88.3 |

Data from Table I illustrates that the combination composition is synergistic in that better weed control was obtained than would be expected. According to the technique described in Colby, S. R., "Calculating Synergistic and Antagonistic Responses of Herbicide Combinations," Weed, 15, 20 (1967) the expected activity of the herbicidal combination would be 77.9%, over 10% less than that actually found.

EXAMPLE II

Field studies with the herbicidal compositions were applied in two locations representing two soil types. The compositions were formulated to assimilate representative rates and spray dilutions used in normal cultural practices. A randomized block design was used to locate each 5' x 20' plot. Natural weed infestations of pigweed—*Amaranthus retroflexus*, lamb's-quarters—*Chenopodium album*, purslane—*Portulaca oleracea* and crabgrass—*Digitaria sanguinalis* were uniformly distributed over plot area. The chemicals were applied with a $CO_2$ bicycle sprayer at 30 gallons spray solution per acre. Table II illustrates the unique and unexpected synergism of stated combination on sandy loam and silt loam soil. The data for the sodium N-naphthyl phthalamate and the 4(methyl sulfonyl)-2,6-dinitro-N,N-dipropyl aniline were obtained by interpolation of published data for comparable herbicidal tests.

TABLE II

| Treatment | Application rate, lbs. herbicide/acre | Percent weed control |
|---|---|---|
| Sodium N-naphthyl phthalamate | 1.0 | 28.0 |
| 4(methyl sulfonyl)-2,6-dinitro-N,N-dipropyl aniline | 0.25 | 10.0 |
| Concentrate C on sandy loam | 1.25 | 88.3 |
| Concentrate C on silt loam | 1.25 | 83.3 |

The combination of herbicides shows unexpected herbicidal synergism in the above field tests in that the combination gives significantly better weed control than the sum of the percent weed control of each herbicide alone.

Having thus described our invention, what we claim and desire to protect by Letters Patent is:

1. A herbicidal composition which consists essentially of a herbicidally effective amount of an admixture of about 4 parts by weight of sodium N-naphthyl phthalamate per 1 part by weight of 4-(methylsulfonyl)-2,6-dinitro-N,N-dipropylaniline.

2. A single phase herbicidal concentrate which consists essentially of a herbicidally effective amount of an admixture of about 4 parts by weight of sodium N-naphthyl phthalamate per 1 part by weight of 4-(methylsulfonyl)-2,6-dinitro-N,N-dipropylaniline; dimethylsulfoxide; and a water immiscible solvent selected from the group consisting of nitrobenzene, monochlorobenzene, nitropropane-1 and nitropropane-2.

References Cited

UNITED STATES PATENTS

| 2,556,665 | 6/1951 | Smith et al. | 71—115 |
| 2,701,759 | 2/1955 | Feldman et al. | 71—114 |
| 2,701,760 | 2/1955 | Smith et al. | 71—114 |
| 2,736,646 | 2/1956 | Smith et al. | 71—114 |
| 2,736,647 | 2/1956 | Smith et al. | 71—114 |
| 3,172,750 | 3/1965 | Altscher et al. | 71—110 |
| 3,321,292 | 5/1967 | Soloway et al. | 71—103 |

OTHER REFERENCES

Gast et al.: Agricultural Chemicals, 11 (4), 42–45) 136, 137, 139 (1956).

Keil: Agricultural Chemicals, 20 (4), 23, 24, 128 (1965).

LEWIS GOTTS, Primary Examiner

M. M. KASSENOFF, Assistant Examiner

U.S. Cl. X.R.

71—111, 114, 115